Patented Oct. 28, 1947

2,429,886

UNITED STATES PATENT OFFICE 2,429,886

N - ALKYL - DI(BETA - (ALKOXYMETHOXY) ALKYL) AMINES AND PROCESS FOR PREPARING

Donald J. Loder, Wilmington, Del., assignor to E. I. du Pont de Nemours & Company, Wilmington, Del., a corporation of Delaware No Drawing. Application July 3, 1944, Serial No. 543,413

6 Claims. (Cl. 260—584)

1

This invention relates to alkylation of organic compounds and to the preparation thereby of new compositions of matter. More particularly the invention relates to the N-alkylation of di-(beta-(alkoxymethoxy) alkyl) amines and to the resulting alkylated products.

An object of the present invention is to provide a process for the alkylation of di(beta-(alkoxymethoxy) alkyl) amines by the reaction of such amines with an alkyl sulfate or an alkyl halide. Another object is to provide new compositions of matter resulting from the N-alkylation of di-(beta-(alkoxymethoxy) alkyl)-amines. A further object is to provide suitable reaction conditions for conducting these alkylation reactions. Other objects and advantages of the invention will hereinafter appear.

The process may be generically illustrated by these equations:

(1) $2(ROCH_2OR)_2NH + (R_1)_2SO_4 + Na_2CO_3 \rightarrow$
$2(ROCH_2OR)_2NR_1 + Na_2SO_4 + H_2O + CO_2$ (2) $(ROCH_2OR)_2NH + R_1Cl \rightarrow$
$(ROCH_2OR)_2NR_1.HCl$ (3) $(ROCH_2OR)_2NR_1.HCl + NaOH \rightarrow$
$(ROCH_2OR)_2NR_1 + NaCl + H_2O$ in which R and $R_1$ are similar or dissimilar alkyl groups.

The process is conducted in accord with the invention by introducing a di(beta-(alkoxymethoxy) alkyl) amine and an alkyl sulfate or alkyl halide into a reaction vessel and conducting the reaction therein at a temperature between 20 and 150° C. for a period of time in the order of from 1 to 4 hours. When the di-substituted amine is alkylated by means of a dialkyl sulfate, free sulfuric acid is liberated. This acid results in decomposition of the di-substituted amine generically described, unless an alkaline material such as an alkali metal or alkaline earth metal hydroxide or carbonate is present. Moreover, inasmuch as the alkaline substances decompose the alkyl sulfates to some extent, the reaction is conducted in accord with a preferred embodiment by the simultaneous introduction of two streams into the di-substituted amine, the dialkyl sulfate being one stream and an aqueous solution of the alkaline substance being the other stream, a slight molar excess of the alkaline substance being introduced over that necessary to convert all of the sulfate ions to a metal sulfate.

When the di-substituted amine is alkylated by means of an alkyl halide, no alkaline substance is added during the reaction although the product

2 is obtained as a halide. It may be isolated as such or converted to the N-alkylamine by neutralization of the halide with a base.

The di(beta-(alkoxymethoxy) alkyl) a m i n e s that may be alkylated in accord with this invention include, for example, more particularly, di-(beta-(methoxymethoxy) ethyl) amine, di(beta-(isobutoxymethoxy) ethyl) amine, di(beta-(ethoxymethoxy) ethyl) amine, as well as the unsymmetrical alkyl, beta-(alkoxyalkoxy) alkylamine ($ROCH_2OR.NH.R$) such, for example, as methyl, beta-(methoxymethoxy) ethylamine, and the higher alkyl symmetrical and unsymmetrical di-(beta-(alkoxymethoxy) alkyl) amines such, for example, as the di(beta-(alkoxyalkoxy) propyl) - amines; di(beta-(alkoxyalkoxy) butyl) amines, etc. These amines are prepared in accord with the process described in application S. N. 430,995. Generally, they may be formed by a liquid phase hydrogenation reaction wherein an alkyl amino ethyl formal is hydrogenated in the presence of a suitable hydrogenation catalyst such as nickel or cobalt the reaction being conducted at a temperature between 25 and 200° C. and at a pressure between 200 and 700 atmospheres.

The reaction may be conducted in the presence of any dialkyl sulfate or halide as the alkylating agent such, for example, as the dimethyl, diethyl, dipropyl and higher sulfate and corresponding monoalkyl halides such as the chlorides, bromides, and fluorides. The alkylating agent should be present in amounts from 0.5 to 1.5 moles thereof per mole of the amine to be alkylated. The hydroxide or carbonate of sodium, potassium or calcium may be used to replace up to about one-half, on a mole basis, of the alkyl sulfate used and sufficient water being used to dissolve the alkylating agent.

More detailed practice of the invention is illustrated by the accompanying examples of preferred embodiments of the invention in which parts are by weight unless otherwise indicated.

*Example 1.*—A vessel was partially filled with 44.2 parts (0.2 mole) of di(beta-(ethoxymethoxy) ethyl) amine into which 15.4 parts (0.1 mole) of diethyl sulfate and 12.4 parts (0.1 mole) of $Na_2CO_3.H_2O$ in 30 parts of water was introduced, the ethyl sulfate and aqueous carbonate being added to the amine gradually over a period of about ½ hour during which the temperature was at 27 to 31° C. The diethyl sulfate and the aqueous solution of the sodium carbonate were introduced simultaneously in separate streams. The reaction was then conducted at a temperature of 91 to 92° C. for 2¼ hours. The product N-ethyl di(beta-(ethoxymethoxy)ethyl)amine,

was obtained in a yield of about 92%. This amine is a colorless liquid B. P. 98–99° C. at 2 mm. and has a neutral equivalent of 249.

*Example 2.*—The process of Example 1 was repeated using 44.2 parts (0.2 mole) of di(beta-(ethoxymethoxy)ethyl)amine, 18.5 parts (0.12 mole) of diethyl sulfate, 17.4 (0.14 mole) of $Na_2CO_3.H_2O$ and 40 parts of water, the sulfate and carbonate being added over a period of 1.88 hours at a temperature of 88–93° C. The reaction was conducted at a temperature of 92 to 93° C. for 1.3 hours. A 93% yield of the N-ethyl di(beta-(ethoxymethoxy)ethyl)amine was obtained.

*Example 3.*—By processing 20 parts (0.0905 mole) of di(beta-(ethoxymethoxy)ethyl)amine with 7 parts (0.045 mole) of the diethyl sulfate at a temperature of 120 to 130° C. for 2 hours a 72% yield of the N-ethylamine was obtained.

*Example 4.*—By processing 44.2 parts (0.2 mole) of di(beta-(ethoxymethoxy)ethyl)amine with 12.9 parts (0.2 mole) of ethyl chloride at 100° C. for 3 hours a 94% yield of the hydrochloride of N-ethyl di-(beta-(ethoxymethoxy)ethyl)amine was obtained.

The synthesis may, if desired, be carried out by way of a continuous process as distinguished from a batchwise process. By such a process the di(beta-(alkoxymethoxy)alkyl)-amines, together with the alkylating agent, are introduced continuously into a reaction zone with continuous and vigorous agitation, the N-alkyl amines being continuously withdrawn.

I claim:

1. N-ethyl di(beta-(ethoxymethoxyl)ethyl)amine.

2. A process for the preparation of an N-ethyl-di(beta-(ethoxymethoxy)ethyl)amine which comprises subjecting a di(beta-(ethoxymethoxy)-ethyl)amine to a reaction with an ethyl sulfate in the presence of an aqueous solution of sodium carbonate at a temperature between 20 and 150° C.

3. A process for the preparation of an N-alkyl-di(beta-(ethoxymethoxy)ethyl)amine which comprises subjecting a di(beta-(ethoxymethoxy)ethyl)amine to a reaction with an alkyl sulfate in the presence of an aqueous solution of sodium carbonate.

4. A process for the preparation of an N-alkyl-di(beta-(alkoxymethoxy)alkyl)amine which comprises subjecting a di(beta-(alkoxymethoxy)-alkyl)amine to a reaction with an alkyl sulfate in the presence of an aqueous solution of an alkali metal carbonate.

5. A process for the preparation of N-alkyl di-(beta-(alkoxymethoxy)alkyl)amines which comprises subjecting a di(beta-(alkoxymethoxy)-alkyl)amine to a reaction with an alkyl sulfate and an aqueous solution of a substance selected from the group consisting of alkali metal and alkaline earth metal hydroxides and carbonates wherein the alkyl sulfate and aqueous solution of the alkaline substance are introduced into the amine as two streams and simultaneously.

6. A process for the preparation of N-alkyl di-(beta-(alkoxymethoxy)alkyl)amines which comprises subjecting a di(beta-(alkoxymethoxy)alkyl)amine to a reaction with an alkyl sulfate and an aqueous solution of a substance selected from the group consisting of alkali metal and alkaline earth metal hydroxides and carbonates.

DONALD J. LODER.

REFERENCES CITED

The following references are of record in the file of this patent:

UNITED STATES PATENTS

| Number | Name | Date |
| --- | --- | --- |
| 2,016,956 | Calcott | Oct. 8, 1935 |
| 2,063,934 | Keller | Dec. 15, 1936 |
| 2,090,485 | Perkins | Aug. 17, 1937 |
| 2,139,818 | Goldberg | Dec. 13, 1938 |
| 2,212,149 | Brubaker | Aug. 20, 1940 |
| 2,302,388 | Hester | Nov. 17, 1942 |